March 11, 1924. 1,486,794
E. OWEN
APPARATUS FOR THE TREATMENT OF COAL OR SIMILAR CARBONACEOUS SUBSTANCES
Filed Jan. 28, 1921 4 Sheets-Sheet 1
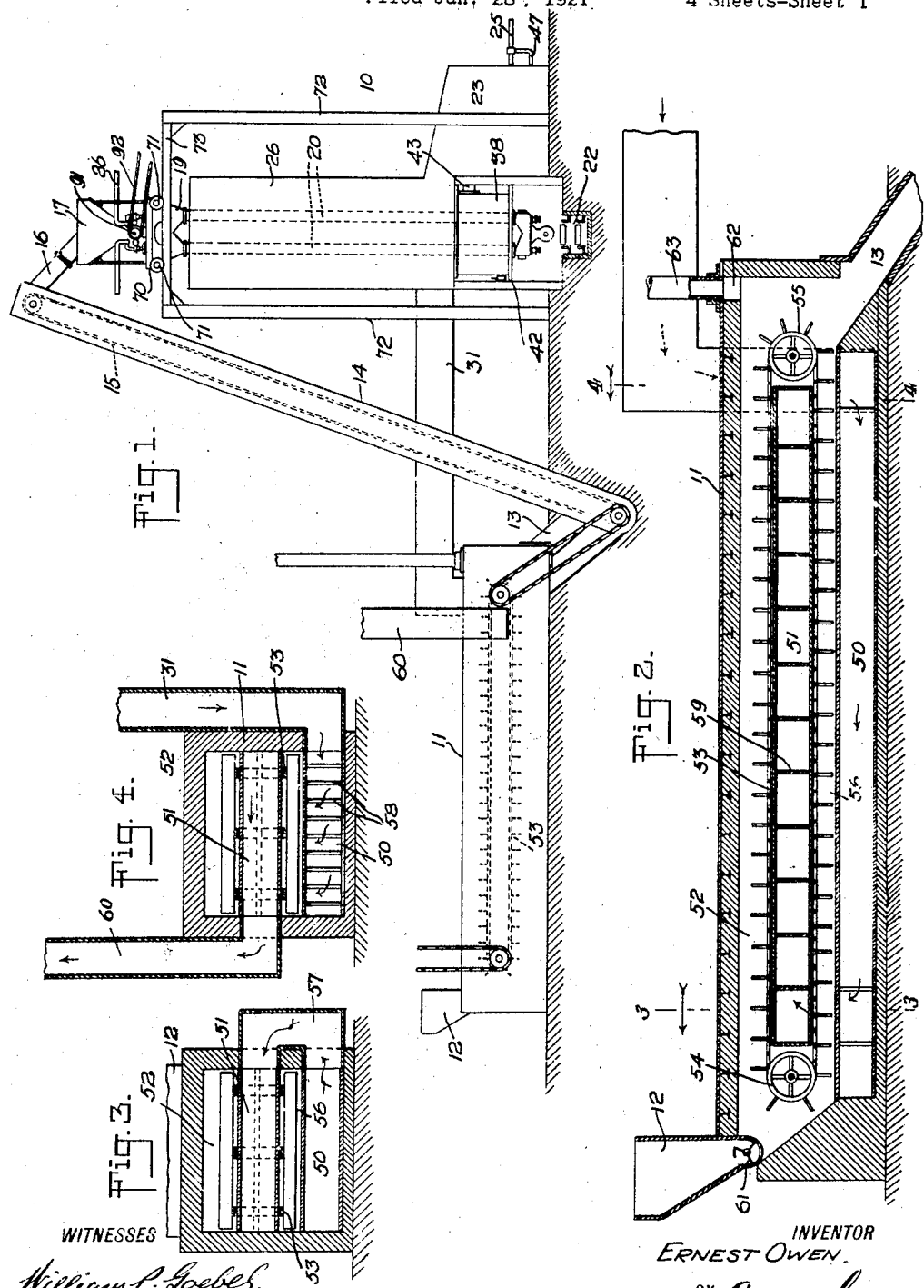
WITNESSES
William P. Goebel.
Hugh H. Ott.
INVENTOR
ERNEST OWEN.
BY
ATTORNEYS March 11, 1924.  
E. OWEN  
1,486,794  
APPARATUS FOR THE TREATMENT OF COAL OR SIMILAR CARBONACEOUS SUBSTANCES  
Filed Jan. 28, 1921    4 Sheets-Sheet 2
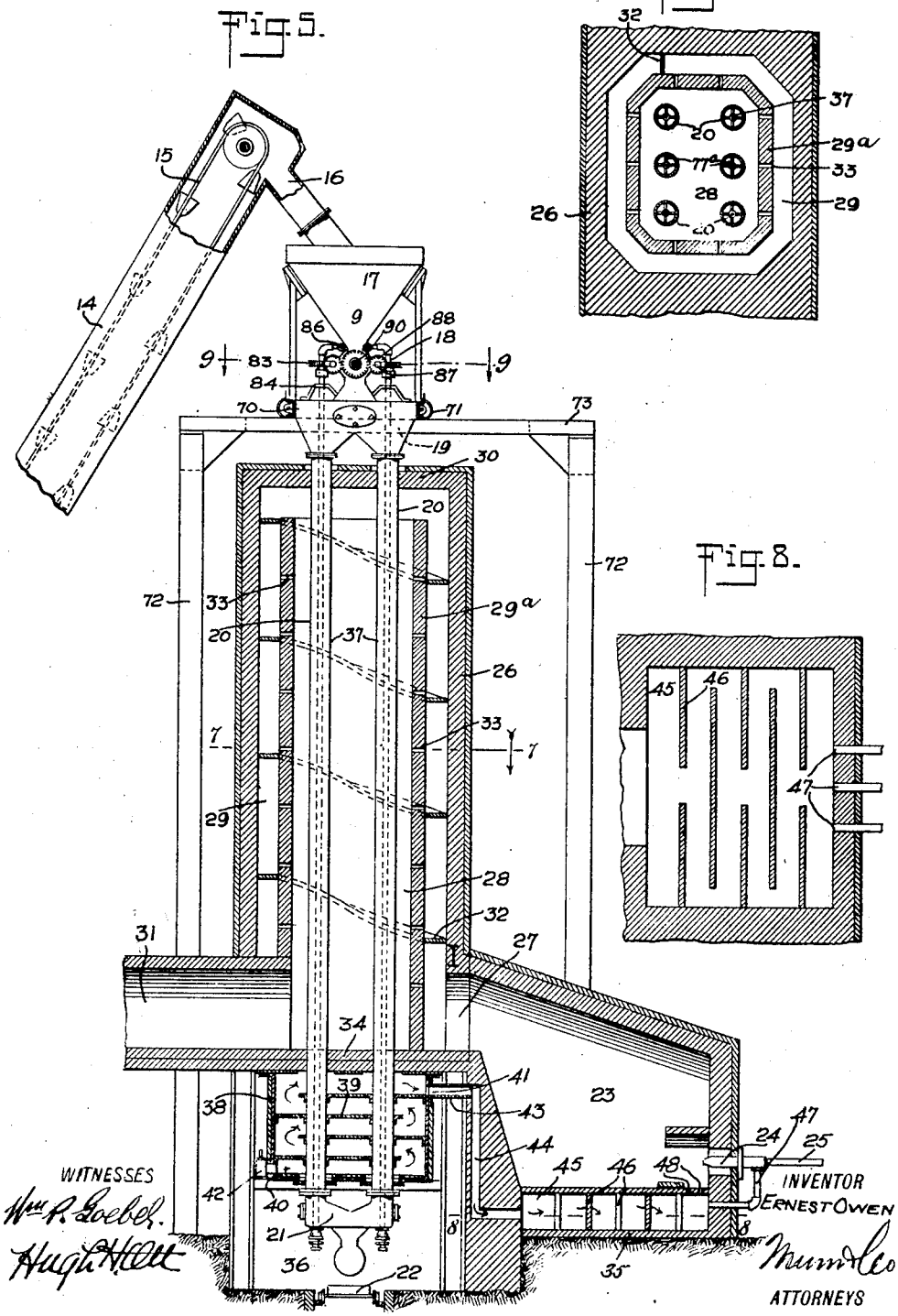

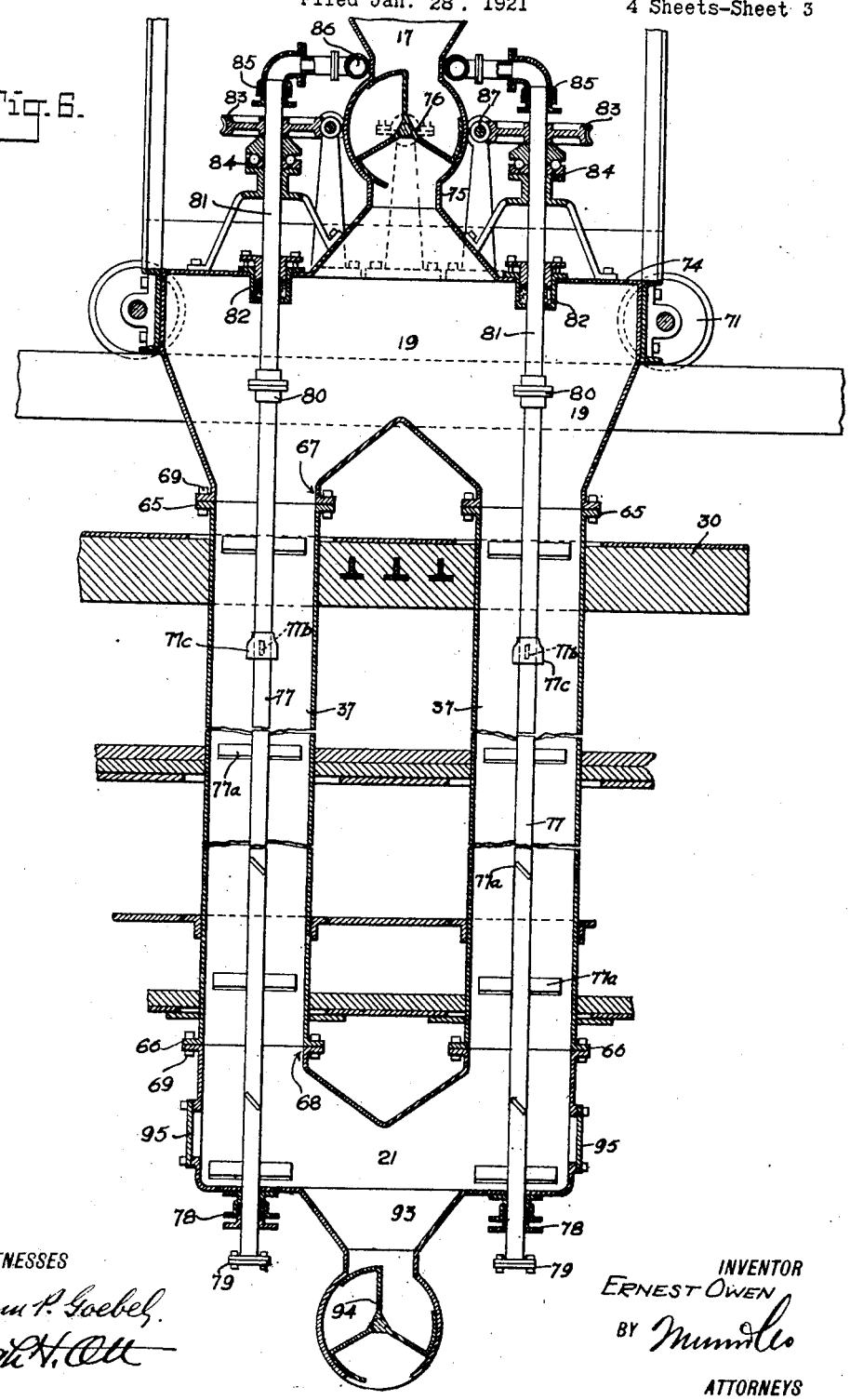

March 11, 1924.
E. OWEN
1,486,794
APPARATUS FOR THE TREATMENT OF COAL OR SIMILAR CARBONACEOUS SUBSTANCES
Filed Jan. 28, 1921
4 Sheets-Sheet 4
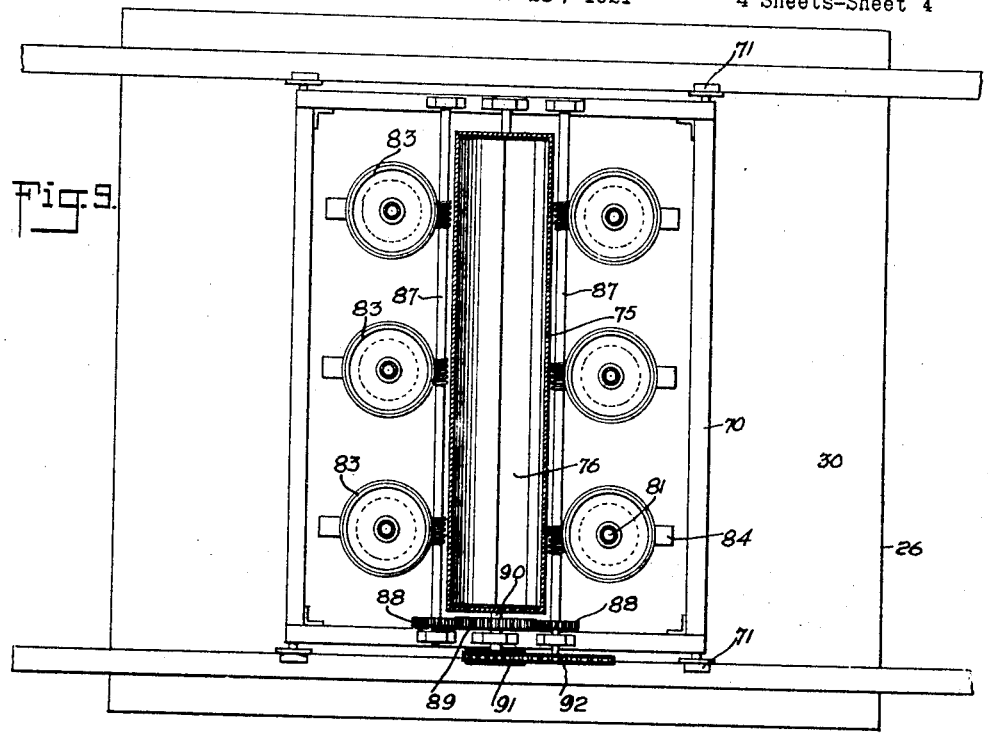
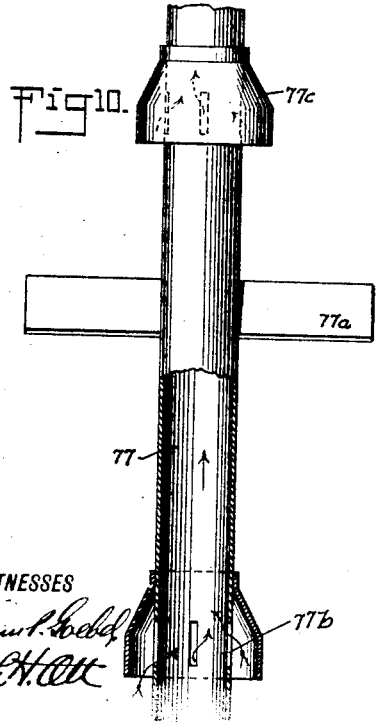
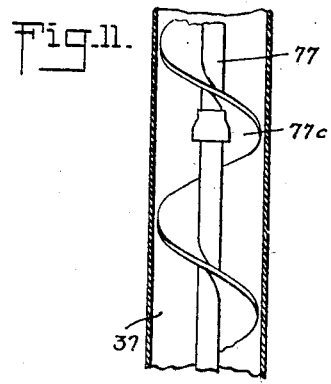
WITNESSES
INVENTOR
ERNEST OWEN
BY
ATTORNEYS Patented Mar. 11, 1924.

1,486,794

UNITED STATES PATENT OFFICE.

ERNEST OWEN, OF NEW YORK, N. Y.

APPARATUS FOR THE TREATMENT OF COAL OR SIMILAR CARBONACEOUS SUBSTANCES.

Application filed January 28, 1921. Serial No. 440,730.

*To all whom it may concern:*

Be it known that I, ERNEST OWEN, a citizen of the United States, and a resident of the city of New York, borough of Manhattan, in the county and State of New York, have invented a new and Improved Apparatus for the Treatment of Coal or Similar Carbonaceous Substances, of which the following is a clear and detailed description.

This invention relates to an apparatus for the treatment of coal or other similar carbonaceous substances and has particular reference to a coking furnace for the low temperature carbonization of lignite coal.

In the usual method of carbonizing coal, in by-product coke ovens, the same is heated in a refractory retort, the walls of which are externally fired. As these walls are of considerable thickness and are built of a material which is a poor conductor of heat, it is necessary to heat the same to a considerably higher temperature than that to which it is desired to raise the coal to be carbonized, with the result that the flue gases leave the furnace proper at an unnecessarily high temperature. Furthermore as the coal and coke are also poor conductors of heat, the heat is very slow to penetrate the center of the body of coal causing the particles in contact with the wall of the retort to be subjected to a considerably higher temperature than those in the center of the body or charge with the result that the progress of distillation is variable in different strata of coal. The volatile products as they are disengaged rise upwards towards an exit, coming in contact with the hot coke and heated walls of the retort as they ascend. These gases on striking the hot surfaces are cracked or broken up with the formation of a large volume of unsaturated hydro carbons, carbon and fixed or permanent gases. There is also a tendency for the ammonia liberated to dissociate into nitrogen and hydrogen. The carbon adheres to a certain extent to the walls of the retort causing a clogging of the same. Furthermore the operation of most furnaces of this character, is intermittent with the resultant loss in production and operating efficiency.

In the usual type of coke oven, the partial recovery of the heat in the waste flue gases is accomplished by the provision of a checker work of heat absorbing material in the walls of the oven, the structure being so arranged that during a portion of the heating cycle, the checker work adjacent to one half of the oven walls is being heated while that adjacent to the other half of the oven walls is being cooled by giving up its heat to the incoming air. This subjects the walls to very severe strains from contraction and expansion, causing said walls to crack and allow the gases of distillation to waste. Furthermore only a relatively small amount of the heat in the flue gases can be removed in this way, the gases leaving the regenerator at a high temperature.

This invention therefore contemplates and seeks for its principal object to provide an apparatus of the character described which will overcome the above recited objections by insuring a uniform treatment of every particle of coal distilled; a uniform treatment of the whole of the gases evolved, preventing the degradation of the hydro carbons by contact with the hot coke or heated walls of the retort; a most efficient utilization of the heat contained in the fuel used to effect the distillation; the extraction and utilization of the heat retained in the residuum coke to effect the preheating of the air supply to the burner; the primary treatment of the coal in a preheating chamber which is heated from the retort or furnace to initially effect the driving off of the water and vapors such as carbon monoxide, carbon dioxide and light saturated or unsaturated hydrocarbons in the coal prior to its introduction to the coking tubes; and the arrangement of an apparatus so that the removal, replacement and cleaning of the parts may be effected with a minimum loss of operating time.

Furthermore the invention contemplates the provision of an apparatus for the treatment of coal or similar carbonaceous substances, through which said substances may be continuously fed and acted upon so that no resultant loss of heat generated will be caused by intermittent operations.

With the above recited objects and advantages in mind, the invention resides in the novel construction, combination and arrangement of parts, set forth in the following specification, particularly pointed out in the appended claims and illustrated in the accompanying drawings forming a part of this application and in which;

Figure 1 is a side elevation of the complete apparatus.

Figure 2 is a longitudinal sectional view through the preheater.

Figure 3 is a transverse sectional view taken approximately on the line 3—3 of Figure 2.

Figure 4 is a similar sectional view taken approximately on the line 4—4 of Figure 2.

Figure 5 is a fragmentary vertical sectional view through the furnace or retort illustrating the heating tubes and feeding mechanism therefor in side elevation.

Figure 6 is a fragmentary sectional view through the heating tubes and feeding mechanism therefor.

Figure 7 is a horizontal sectional view through the furnace taken approximately on the line 7—7 of Figure 5.

Figure 8 is a similar view taken approximately on the line 8—8 of Figure 5.

Figure 9 is a fragmentary horizontal section taken approximately on the line 9—9 of Figure 5.

Figure 10 is a fragmentary enlarged side view of the collector shaft.

Figure 11 is an enlarged fragmentary vertical sectional view through one of the coking tubes illustrating a modification of the invention.

Referring to the drawings by characters of reference, 10 designates the furnace which includes a heating chamber and a combustion chamber and 11 the preheater into the hopper 12 of which the coal or similar substance is charged. The coal travels through the preheater and is ejected therefrom through the chute 13 into a suitably insulated elevator 14 from whence it is carried by an endless conveyor 15 to the top of the elevator and discharge frame to the pipe 16 into a hopper 17 from whence it gravitates through a suitable feeding mechanism 18 into the manifold hopper 19 which supplies the retorts or coking tubes 20 arranged in the heating chamber of the furnace 10.

The lower extremities of the retort or coking tubes communicate with a common receiving chamber 21 from which the coke or residue is discharged onto an endless conveyor 22.

The furnace 10 includes a combustion chamber 23 to which adjacent the lower end thereof are inserted the burners 24 to which the fuel is supplied by a conduit pipe 25. Preferably said fuel consists of the uncondensed or fixed gases which are obtained from a suitable condenser not shown. The combustion chamber of the furnace 10 communicates with the main body or heating chamber 26 through the passage 27 as clearly illustrated in Figure 5 of the drawings. The heating chamber 26 is divided into inner and outer compartments 28 and 29 by means of the interiorly spaced tubular wall 29ª, the upper extremity of which terminates below the top wall 30 of the oven to establish communication between the inner chamber or compartment 28 and the outer chamber or compartment 29. A flue 31 communicates with the inner chamber 28 at the lower extremity thereof while the passage 27 establishes direct communication between the outer chamber 29 and the combustion chamber 23. A spiral baffle wall 32 is arranged in the outer chamber 29 for the purpose of compelling the majority of the heat and products of combustion generated in the combustion chamber, to travel in a helical path from the lower end of the chamber 29 to the upper end thereof from whence it is drawn through the upper open end of the tubular wall 29 downwardly through the inner chamber 28 to the flue 31. The tubular wall is provided with a plurality of small passages 33 which permit a small portion of the heat and products of combustion to pass therethrough from the outer chamber 29 during its passage therethrough, into the inner chamber 28. The bottom wall 34 of the heating chamber 26 is disposed an appreciable distance above the ground line upon which the bottom wall 35 of the combustion chamber rests and the endless conveyor 22 is arranged in a trough or ditch 36. The coking tubes or retorts 20 are arranged vertically in the inner chamber 28 of the oven and extend respectively through the top wall 30 and the bottom wall 34 thereof. The lower portions of the tubes which lie between the bottom wall 34 and the common receiving chamber 21 are housed by an air cooling box 38 provided with a plurality of baffle plates 39 which are alternately arranged therein to compel the air received at the intake 40 to travel in a sinuous course to the outlet 41. A suitable valve 42 is provided for controlling the entrance of air to the intake 40. The outlet 41 is connected by a pipe 43 to a passage 44 in the furnace wall and said passage communicates at its opposite end with an air heating chamber 45 in the bottom wall 35 of the combustion chamber. The air heating chamber is provided with a plurality of baffle plates 46 disposed in staggered relation between the air inlet and outlet pipes 47 to delay the passage of air through the heating chamber 45. The outlet pipes 47 communicate with the burner nozzles 24 to superheat the fuel gas prior to its combustion. A portion of the air from the chamber 45 is projected through the outlet openings 48 within the combustion chamber directly in front of the burner nozzle. From this construction it will be seen that the air received by the air heating chamber 45 which has been partially heated in the box 38 is further tempered in the chamber 45 by the heat of the combustion chamber 23 during its passage through the chamber 45 in the bottom wall 35 of said combustion chamber thus utilizing the heat which would ordinarily be wasted. The flue 31 leading from the inner chamber 28 of the heating chamber 26 is connected at its opposite end to the preheater 11.

The preheater includes superposed heating chambers 50 and 51, the former being arranged at the bottom of the preheater and the latter in the conveyor compartment 52. An endless conveyor 53 is trained over the rollers 54 and 55 which are mounted at the opposite ends of the upper chamber 51 whereby the lower lead of said conveyor will travel from the roller 54 to the roller 55 in the space 56 between the superposed heating chambers 50 and 51. The bottom of the charging hopper 12 empties into the conveyor apartment 52 adjacent the roller 54 and the coal supply received therefrom is advanced throughout the space 56 into the discharge chute 13 adjacent the roller 55. The flue 31 enters the heating chamber 50 adjacent the roller 55 and a lateral by-pass 57 establishes communication between the chambers 50 and 51 at the opposite end adjacent the roller 54. The chamber 50 is provided with a plurality of longitudinally arranged vertical walls 58 while the chamber 51 is provided with a plurality of transversely arranged staggered baffles 59. The end of the chamber 51 adjacent the roller 55 communicates with a suitable stack 60 through which the products of combustion generated in the combustion chamber 23 are expelled to the atmosphere. By this arrangement it will be seen that the products of combustion will be compelled to travel through the chamber 50 from the flue to the opposite end and upwardly through the by-pass 57 to the chamber 51, thence to the opposite end of the chamber 51 and out through the stack 60, said products being compelled by the baffle blades 59 to take a sinuous course through the chamber 51. The hopper 12 is provided with a suitable rotary feeder 61 at its discharge end which seals the conveyor compartment 52 against communication with the atmosphere. The opposite end of the conveyor compartment is provided with an opening 62 in the top wall thereof which communicates with a pipe 63. By this arrangement the coal supply which is fed to the elevator 14 is sufficiently preheated to drive off the moisture and vaporize the lighter constituents such as carbon monoxide, carbon dioxide and light saturated and unsaturated hydrocarbons which latter are carried off through the opening 62 by the pipe 63. The body of the coal supply will be compelled to travel through the space 56 between the heating chambers 50 and 51 whereby the full benefit of the heat in such chambers will be played upon the supply from the top and bottom.

The coking tubes or retorts 20 are arranged in batteries and are flanged at their opposite ends as at 65 and 66. The manifold hopper 19 and the common receiving chamber 21 are respectively provided with flanged hollow bosses 67 and 68, said flanges co-acting with the flanges 65 and 66 of the tubes and receiving the securing bolts 69 for detachably connecting the tubes to the bosses. The manifold hopper is supported by the frame 70 which constitutes a carriage having supporting wheels 71. A plurality of vertical beams 72 support the longitudinal beams 73 which constitute the tracks upon which the supporting wheels 71 operate. The manifold hopper 19 is covered by a hood 74 which is connected to the receiving hopper 17 by a neck 75 in which the rotary feeder 76 is mounted. The rotary feeder 76 is of the usual construction to admit of the discharge of the contents of the receiving hopper 17 into the manifold hopper 19 without establishing direct communication between the hoppers 19 and 17. A vertical hollow collector shaft 77 is concentrically arranged in each coking tube or retort 20, the same extending through a stuffing box or gland 78 in the lower wall of the common receiving chamber 21, the exposed lower end thereof being closed by a removable plate 79. The upper extremity of each collector shaft is connected by a suitable detachable union 80 to a hollow shaft section 81 which passes through the stuffing box or gland 82 in the hood of the manifold hopper. A worm gear 83 mounted on a suitable bearing 84 is keyed to the shaft section 81 for the purpose of effecting rotations of the same. The upper extremity of the hollow shaft section 81 is swiveled as at 85 into a manifold 86 which leads to a condenser not shown. Parallel worm shafts 87 are mounted at opposite sides of the hopper and the same mesh with the worm gears 83 for driving the latter. The said worm shafts 87 are each provided with a drive gear 88 which mesh with a gear 89 keyed to the drive shaft 90 of the rotary feeder 76. A sprocket 91 mounted on the shaft 90 has trained thereover a sprocket chain 92 driven from a suitable motor not shown. The hollow collector shafts 77 are provided throughout their length with a plurality of agitator blades 77$^a$ and are formed with outlet slots 77$^b$ which are disposed beneath the hoods 77$^c$. The common receiving chamber into which the coking tubes empty at their lower ends, is provided with a discharge spout 93 in the lower wall thereof, the same being provided with a rotary feeder 94 similar to the feeder 76. The chamber 21 is provided with hand holds 95 which by access may be had to the interior for cleaning purposes.

In operation, the coal after having passed through the preheater 11 to the elevator 14 is carried thereby and emptied through the discharge pipe 16 into the receiving hopper 17, said charge being fed through the feeder 76 in neck 75 to the manifold hopper 19. From the manifold hopper 19 the body of the charge will be distributed to the various coking tubes, or retorts 20 around the hollow collector shafts 77 which rotate in a clockwise direction while blades 77$^a$ moving therewith will agitate the charge during its passage through the tubes to effect a uniform heating of the particles thereof. The gases evolved in the coking tubes will pass through the outlet slots 77$^b$ and will ascend therethrough to the hollow shaft sections 81 and thence to the manifold 86 where they will be carried to the condenser. The hood 77$^b$ will function to prevent the entrance of the coal particles through the slots. When the charge reaches the lower ends of the tubes, in the form of coke, the same will be discharged through the outlet nozzle 93 and feeder 94 onto the endless conveyor 22 disposed therebeneath. The passage of the coke through the lower portion of the tubes 37 which are arranged in the cooling box 38 will effect a substantial cooling of the same to eliminate the necessity of later quenching it while the heat absorbed by the air in the cooling box 38 preheats the same prior to the passage of said air to the final heating chamber 45.

The construction and arrangement described admits of ready access to the various parts for the purpose of cleaning and removing carbon deposits. To clean the tubes 37, the bolts 69 are removed and the unions 80 connecting the shafts 77 with the shaft sections 81 are detached, the shafts 77 being dropped to permit the carriage for the hoppers 17 and 19 to be rolled on the tracks 73. The common receiving chambers are lowered and supported below the lower ends of the tubes and it will thus be seen that access may be readily had to the various parts to clean the same. It should be noted that the exterior shell or covering of the furnace 10 and the top and bottom walls of the cooling box 38 are provided with aligned openings of a sufficient size to admit of the passage of the coking tubes or retorts and flanges therethrough whereby the same may be withdrawn from the furnace and cooling box vertically after the carriage and feed hopper have been disconnected and moved to one side. To accomplish this a portion of the brick work adjacent the openings in the furnace body are cut away and adapted to be replaced after the tubes are reinserted.

It is intended primarily to utilize the apparatus disclosed for the low temperature carbonization of lignite coal. In this case the lignite would be heated in the retort to approximately 1200° F., resulting in the production of a coke containing considerable volatile matter. The hot gases utilized for heating would then leave the coking retort proper at about 1300° F., and would be conducted to the flues of the preheater. The temperature to which the coal is heated in the preheater will depend upon the amount of heat lost from the hot flue gases by radiation, the character of the construction of the preheater and other vapors, but it is intended and desirable to utilize as much heat as possible. With the temperature above mentioned, it would probably not be possible to preheat above 800° F. under the best conditions. The gases liberated in the preheater would be water vapor, carbon monoxide, carbon dioxide and the lower saturated and unsaturated hydrocarbons.

In the carbonization of bituminous coal it would become necessary to preheat the coal to a temperature above that at which it attains a pasty condition before it would be introduced into the retort, which temperature would approximate 1100° F. This would mean carrying a higher temperature in the retort, i. e., a coking temperature of about 1350° F., if the waste gases from the retort were used to exclusively heat the preheater.

In the modification illustrated in Figure 11 of the drawings, a single spiral blade 77$^c$ is illustrated and employed in lieu of a plurality of individual agitator blades 77$^a$ as illustrated in the preferred form. In this instance the blade 77$^c$ will perform a similar function of the blades illustrated in the preferred form.

I claim:

1. An apparatus for the treatment of carbonaceous substances comprising a furnace body comprising a heating chamber, a battery of tubular retorts extending vertically through said heating chamber with the upper and lower ends thereof projecting therefrom, a manifold hopper communicating with the upper projecting ends of said retorts, a common intake for said manifold hopper, a common manifold discharge hopper having communication with the lower ends of said retorts and having a common discharge, a cooling device embracing the lower exteriorly projecting ends of said retorts, means extending longitudinally through said retorts for collecting and conveying off the gases evolved therein, and means mounted on said collecting means and disposed within the retorts for agitating the charge during its passage therethrough.

2. In an apparatus of the character described, a plurality of coking tubes, a furnace having a heating chamber through which said tubes extend, means connected with the heating chamber for utilizing the heat passing therefrom to effect the preheating of the charge prior to the introduction of the same to said coking tubes, means for conveying the charge from the preheater to the tubes, means in each tube for agitating the charge during its passage therethrough and means in each tube for effecting the collection and removal of the gases evolved therefrom, and means surrounding the lower portion of said tubes disposed exteriorly of the furnace for cooling the residue of the charge prior to its discharge from the tubes.

3. An apparatus of the character described comprising a furnace including a combustion chamber and an oven having inner and outer heating chambers communicating at their upper ends, the outer chamber having communication at its lower end with the combustion chamber, a flue communicating with the inner chamber at its lower end, a battery of coking tubes extending through the inner chamber, a manifold feed hopper communicating with the upper end of said tubes, a manifold discharge hopper communicating with the lower end of said tube, a preheater through which the charge is adapted to pass prior to its introduction to the feed hopper, said preheater having communication with the flue and receiving its heat therefrom, and an elevator for receiving the charge from the preheater and depositing the same in the manifold feed hopper.

4. An apparatus for the treatment of carbonaceous substances, comprising a furnace having a heating chamber, a plurality of vertically disposed coking tubes extending through said heating chamber, a manifold feed hopper detachably associated with the upper ends of the tubes, a hollow shaft extending through each tube, an agitator means on said hollow shafts adapted to rotate therewith for stirring the charge during its passage through the tubes, vertically spaced outlet slots located in the hollow shafts for effecting the collection and removal of the gases evolved from the charges within said tubes at various points throughout the length of the same, means for simultaneously rotating the hollow shafts, and a manifold collector having communication with the hollow shafts for receiving the gases removed by the hollow shafts.

5. An apparatus for the treatment of carbonaceous substances, comprising a furnace having a heating chamber, a plurality of vertically disposed coking tubes extending through said heating chamber, a manifold feed hopper having detachable connection with the upper ends of the tubes, means for mounting said hopper in superposed relation to the heating chamber to permit of movement of the same to uncover the tubes when detached therefrom, a hollow shaft extending through each tube, means on the hollow shaft for agitating the charge and facilitating the advancing of the same toward the discharge end of the tubes, and vertically spaced passages in said hollow shafts for effecting the removal of the gases evolved within the tubes at various points throughout their length.

6. In an apparatus of the character set forth, the combination with a furnace body including a combustion chamber and a heating chamber, of a battery of coking tubes extending through the heating chamber, a feed hopper common to one end of said tubes, a discharge hopper common to the lower end of said discharge tubes, an air cooling chamber surrounding a portion of the tubes between the discharge hopper and the retort, a heating chamber disposed beneath the combustion chamber, burners extending into the combustion chamber, and a connection between the outlet of the air cooling chamber and the heating chamber beneath the combustion chamber for leading the partially heated air thereto, tempering the same and introducing the same to a point adjacent the outlet end of the burner, as and for the purpose specified.

ERNEST OWEN.